United States Patent
Wang et al.

(10) Patent No.: US 11,706,685 B2
(45) Date of Patent: Jul. 18, 2023

(54) CONFIGURING ROUTE SELECTION POLICIES

(71) Applicant: Nokia Technologies Oy, Espoo (FI)

(72) Inventors: Zhi Wang, Shandong (CN); Yigang Cai, Naperville, IL (US)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/270,670

(22) PCT Filed: Aug. 24, 2018

(86) PCT No.: PCT/CN2018/102306
§ 371 (c)(1),
(2) Date: Feb. 23, 2021

(87) PCT Pub. No.: WO2020/037666
PCT Pub. Date: Feb. 27, 2020

(65) Prior Publication Data
US 2021/0385724 A1    Dec. 9, 2021

(51) Int. Cl.
*H04W 40/12* (2009.01)
*H04M 15/00* (2006.01)
*H04W 48/18* (2009.01)

(52) U.S. Cl.
CPC ......... *H04W 40/12* (2013.01); *H04M 15/66* (2013.01); *H04W 48/18* (2013.01)

(58) Field of Classification Search
CPC ...... H04W 40/12; H04W 48/18; H04M 15/66
(Continued)

(56) References Cited

U.S. PATENT DOCUMENTS 8,964,685 B2 * 2/2015 Smith .............. H04M 15/60
370/252
10,235,226 B1 * 3/2019 Shekhar ............ H04L 67/02
(Continued)

FOREIGN PATENT DOCUMENTS

CN    106412905 A    2/2017
CN    106572517 A    4/2017
(Continued)

OTHER PUBLICATIONS

3$^{rd}$ Generation Partnership Project; Technical Specification Group Core Network and Terminals; Study on CT WG3 Aspects of 5G System—Phase 1; Stage 3 (Release 15) 3GPP TR 29.890 V1.1.0 (Nov. 2017).
(Continued)

*Primary Examiner* — Mong-Thuy T Tran
(74) *Attorney, Agent, or Firm* — Harrington & Smith (57) ABSTRACT

Systems, apparatuses, and methods are described for configuring route selection policies. A user device may send, to a computing device, a route selection policy request to update route selection policy rules for applications and/or services of the user device. The computing device may determine the route selection policy rules for the applications and/or services based on various criteria. The computing device may send the determined route selection policy rules to the user device. If the user device does not accept the determined route selection policy rules, the user device may send, to the computing device, a negotiation request to obtain other route selection policy rules for the applications and/or services.

20 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,496,573 B2* | 11/2022 | Dao | ...................... | H04W 40/02 |
| 11,582,313 B2* | 2/2023 | Dao | ...................... | H04W 40/02 |
| 2015/0373617 A1* | 12/2015 | Cho | ...................... | H04W 40/12 |
| | | | | 370/329 |
| 2018/0262924 A1* | 9/2018 | Dao | ...................... | H04W 24/02 |
| 2019/0053147 A1* | 2/2019 | Qiao | ................ | H04M 15/8038 |
| 2019/0053308 A1* | 2/2019 | Castellanos Zamora | ..................... | |
| | | | | H04W 60/04 |
| 2019/0268835 A1* | 8/2019 | Shan | ...................... | H04W 48/16 |
| 2019/0394279 A1* | 12/2019 | Dao | ...................... | H04W 48/04 |
| 2021/0152615 A1* | 5/2021 | Karampatsis | ......... | H04W 40/22 |

FOREIGN PATENT DOCUMENTS

| | | | | |
|---|---|---|---|---|
| EP | 3 358 887 A1 | | 8/2018 | |
| EP | 3607772 B1 * | | 11/2021 | ........ H04W 36/0011 |
| EP | 3926990 A1 * | | 12/2021 | ......... H04L 12/1407 |

OTHER PUBLICATIONS

Nokia, Nokia Shanghai Bell, Verizon, InterDigital "Processing Multiple Route Selection Descriptors in a URSP Rule" 3GPP TSG-CT WG1 Meeting #109 C1-181726. Mar. 2, 2018.

"3GPP TS 23.501 V15.1.0, $3^{rd}$Generation Partnership Project; Technical Specification Group Services and System Aspects; System Architecture for the 5G System; Stage 2 (Release 15)", Mar. 2018, 201 pages.

"3GPP TS 23.502 V15.1.0, $3^{rd}$Generation Partnership Project; Technical Specification Group Services and System Aspects; Procedures for the 5G System; Stage 2 (Release 15)", Mar. 2018, 285 pages.

"3GPP TS 24.502 V0.5.0, $3^{rd}$Generation Partnership Project; Technical Specification Group core Network and Terminals; Access to the 3GPP 5G core Network (5GCN) via Non-3GPP Access Networks (N3AN); Stage 3 (Release 15)", Apr. 2018, 31 pages.

"3GPP TS 29.507 V0.4.0, $3^{rd}$Generation Partnership Project; Technical Specification Group Core Network and Terminals; 5G System; Access and Mobility Policy Control Services; Stage 3 (Release 15)", Apr. 2018, 26 pages.

"3GPP TS 29.513 V0.5.0, $3^{rd}$Generation Partnership Project; Technical Specification Group Core Network and Terminals; 5G System; Policy and Charging Control signaling flows and QoS parameter mapping; Stage 3 (Release 15)", Apr. 2018, 46 pages.

* cited by examiner

CONFIGURING ROUTE SELECTION POLICIES

CROSS REFERENCE TO RELATED APPLICATION

This patent application is a U.S. National Stage application of International Patent Application Number PCT/CN2018/102306 filed Aug. 24, 2018, which is hereby incorporated by reference in its entirety.

BACKGROUND

One or more network slices may be created over a network infrastructure, and data may be transmitted via the network slices. Different parameters for each network slice may be used to meet different needs of the network slices. A user device may select a network slice to route traffic generated by a particular application or service running on the user device.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

Systems, apparatuses, and methods are described for configuring route selection policies. A computing device may receive, from a user device and via a network, a route selection policy request. The route selection policy request may indicate an application or service. The computing device may receive, from a second computing device, a message indicating one or more types of traffic associated with the application or service. The computing device may determine, based on the one or more types of traffic, a route selection policy associated with the application or service. The route selection policy may indicate one or more of a protocol data unit session for the application or service or a network slice for the application or service. The computing device may send, to the user device, the route selection policy.

In some examples, the computing device may select, from a plurality of network slices, a network slice suitable for routing the one or more types of traffic. In some examples, the computing device may determine a user type associated with the user device. The determining the route selection policy may be further based on the user type. In some examples, the computing device may determine, based on the one or more types of traffic and the user type, a charging rate for the application or service. The route selection policy may further indicate the charging rate. In some examples, the computing device may comprise a Policy Control Function (PCF), and wherein the receiving the route selection policy request comprises receiving the route selection policy request via an Access and Mobility Management Function (AMF).

In some examples, the computing device may receive, from the user device and based on the route selection policy, a negotiation request indicating a second route selection policy associated with the application or service. The computing device may determine a range associated with the route selection policy. Based on determining whether the second route selection policy is within the range associated with the route selection policy, the computing device may determine whether to accept the second route selection policy. In some examples, based on determining to accept the second route selection policy, the computing device may send, to the user device, a message to apply the second route selection policy.

In some examples, the determining the range associated with the route selection policy may be based on one or more of a user type associated with the user device or current conditions of the network. In some examples, the computing device may determine, based on one or more of a user type associated with the user device or current conditions of the network, whether to allow the user device to negotiate. Based on determining not to allow the user device to negotiate, the computing device may send, to the user device, a message to reject the negotiation request.

In some examples, the computing device may determine a quantity of negotiation requests, associated with the application or service, received from the user device. Based on determining that the quantity of negotiation requests satisfies a threshold quantity, the computing device may send, to the user device, a message to reject the negotiation request. In some examples, the computing device may determine, based on validation parameters associated with the route selection policy request, whether the route selection policy request is valid. The determining the route selection policy may be based on determining that the route selection policy request is valid.

In some examples, based on determining that validation parameters are not indicated in the route selection policy request, the computing device may send, to the user device, a challenge request for the validation parameters. The computing device may receive, from the user device, a message indicating the validation parameters. The computing device may send, to the second computing device, a second message indicating the validation parameters. The computing device may receive, from the second computing device, a message indicating that the route selection policy request is valid.

In some examples, the computing device may determine, based on an identification of the application or service, whether the route selection policy is stored in a database of the computing device. The determining the route selection policy may be based on determining that the route selection policy is not stored in the database of the computing device. In some examples, the receiving the route selection policy request may be based on one or more of: attachment of the user device to the network, movement of the user device, network handover of the user device, a message indicating policy updates from the computing device, or installation of the application or service on the user device.

In some examples, a computing device may comprise means for receiving, from a user device and via a network, a route selection policy request. The route selection policy request may indicate an application or service. The computing device may comprise means for receiving, from a second computing device, a message indicating one or more types of traffic associated with the application or service. The computing device may comprise means for determining, based on the one or more types of traffic, a route selection policy associated with the application or service. The route selection policy may indicate one or more of a protocol data unit session for the application or service or a network slice for the application or service. The computing device may comprise means for sending, to the user device, the route selection policy. Additional examples are further discussed below.

BRIEF DESCRIPTION OF THE DRAWINGS

Some example embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the disclosure may be practiced. It is to be understood that other embodiments may be utilized and structural and functional modifications may be made without departing from the scope of the present disclosure.

Figure 1:
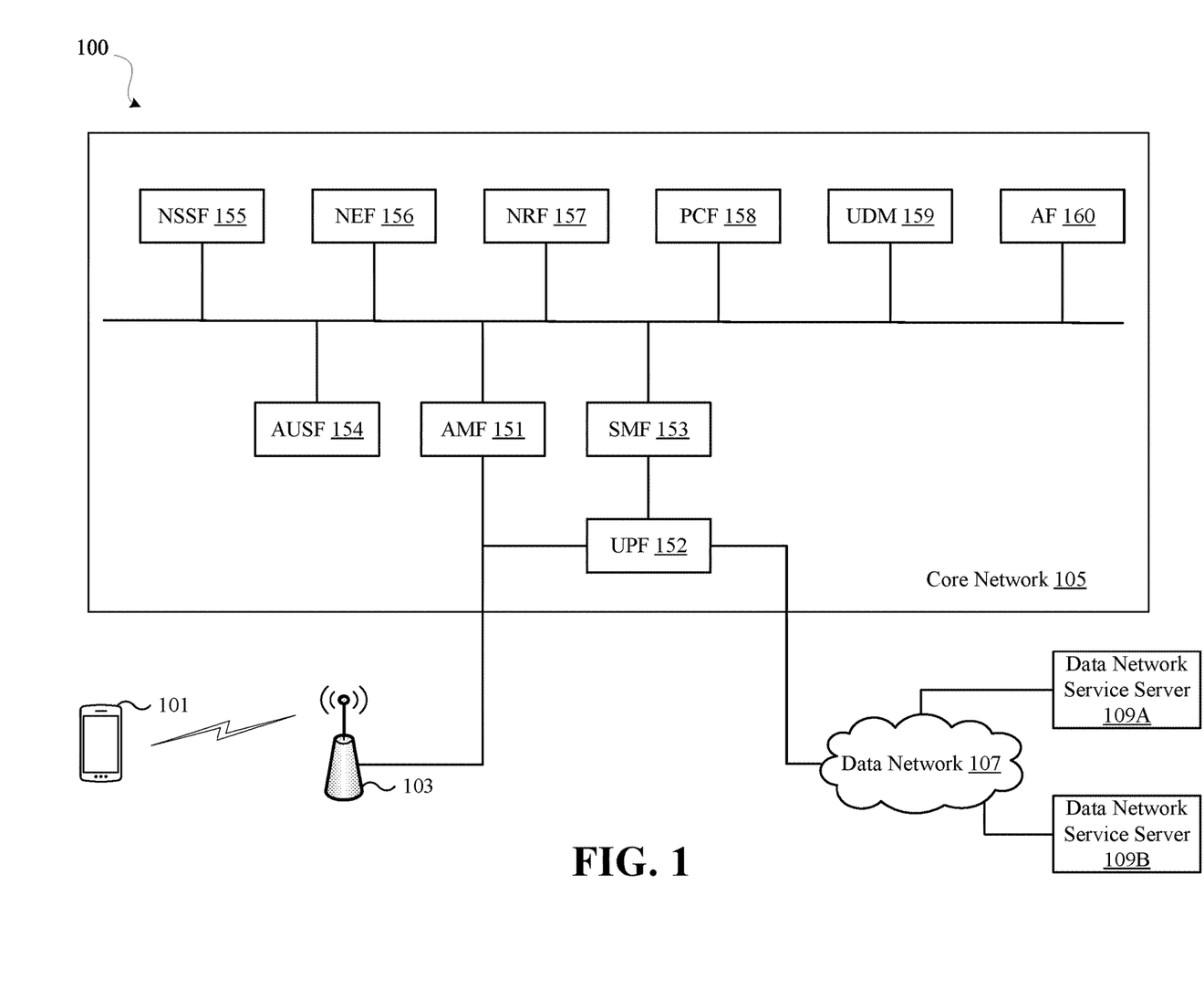
FIG. 1 is a schematic diagram showing an example communication network in which features described herein may be implemented.

FIG. 1 is a schematic diagram showing an example communication network 100 in which features described herein may be implemented. The communication network 100 may include one or more user devices (e.g., user device 101), one or more radio access networks (e.g., radio access network 103), one or more core networks (e.g., core network 105), one or more data networks (e.g., data network 107), and one or more data network service servers (e.g., data network service servers 109A, 109B). The communication network 100 may be configured to implement various communication protocols, such as communication protocols specified by the Third Generation Partnership Project (3GPP).

The user device 101 may include, for example, a smartphone, personal computer, tablet, desktop computer, laptop computer, gaming device, virtual reality headset, or any other mobile device or other fixed device having a wireless interface configured to communicating with a radio access network. A data network service server of the data network service servers 109A, 109B may be a computing device configured to offer any desired application or service.

The data network 107 may be a single network or a collection of multiple connected networks. The data network 107 may include one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The data network 107 may include a local area network (LAN), a wide area network (WAN), a backbone network, etc. The data network 107 may include an Internet Protocol (IP) based network (e.g., the Internet). The data network 107 may include a plurality of interconnected communication links (e.g., to connect the data network service servers 109A, 109B and/or other devices).

The radio access network 103 may include any type of device used to implement radio access technologies, such as the third generation wireless systems (3G), the fourth generation wireless systems (4G), Long Term Evolution (LTE), and the fifth generation wireless systems (5G). For example, the radio access network 103 may include a Universal Terrestrial Radio Access Network (UTRAN), Evolved Node B (eNodeB), gNodeB (gNB), or other types of radio access networks. The radio access network 103 may be configured to implement a radio protocol stack. The radio access network 103 may additionally or alternatively include a cloud radio access network (e.g., comprising central units and distributed units together carrying out the radio protocol stack).

The core network 105 may include processes implemented on one or more computing devices. The core network 105 may be configured to manage connectivity between the user device 101 and the data network 107 (e.g., the Internet) via the radio access network 103. The core network 105 may include, for example, an Evolved Packet Core (EPC), a 5G Core Network, or other types of core networks. The core network 105 may communicate with the radio access network 103 and/or the data network 107 via any type of communication link, such as an IP-based communication link. The radio access network 103 and the core network 105 may be configured to provide wireless communication between the user device 101 and the data network 107 (e.g., the Internet).

Example components of the core network 105 (e.g., a 5G Core Network) are shown in FIG. 1. The core network 105 may include one or more network functions, such as an AMF 151 (Core Access and Mobility Management Function), an UPF 152 (User plane Function), an SMF 153 (Session Management Function), an AUSF 154 (Authentication Server Function), a NSSF 155 (Network Slice Selection Function), a NEF 156 (Network Exposure Function), a NRF 157 (Network Repository Function), a PCF 158 (Policy Control Function), an UDM 159 (Unified Data Management), an AF 160 (Application Function), and/or other network functions. The network functions 151-160 may comprise processes implemented on one or more computing devices. The network functions 151-160 may communicate with each other via any type of communication link, such as an IP-based communication link, a virtual network link, a logical connection, etc. The network functions 151-160 described herein may have similar meanings as those specified by 3GPP (e.g., in 3GPP Technical Specification 23.501 version 15.2.0 Release 15). The core network 105 may include additional or alternative network functions, for example, in order to provide wireless communication between the user device 101 and the data network 107 (e.g., the Internet).

A network (e.g., the communication network 100) or a portion thereof may be sliced into a plurality of virtual networks, which may run on the same physical infrastructure of the network (e.g., an underlying physical 5G infrastructure). A network slice (e.g., a virtual network of the plurality of virtual networks) may include, for example, a radio access network, network functions of a core network, etc. Resources (e.g., computing, storage, and networking resources) of the physical infrastructure may be assigned to a network slice to implement the radio access network and/or network functions of the core network, for example, using Network Function Virtualization (NFV). A network slice may be configured to provide specific network capabilities and network characteristics, and/or may be customized for the user(s) in the network slice.

Various types of network slices may be established for different purposes. For example, an enhanced mobile broadband (eMBB) type network slice may be suitable for handling 5G enhanced mobile broadband traffic, such as augmented reality (AR) or virtual reality (VR) application or service traffic. A massive Internet of Things (MIoT) type network slice may be suitable for handling Internet of Things traffic. An ultra-reliable low latency communications (URLLC) type network slice may be suitable for handling ultra-reliable low latency communications, such as vehicle-to-everything (V2X) communications. Additionally or alternatively, a network slice may be associated with different performance parameters, such as quality of service (QOS) and/or quality of experience (QOE), bandwidth, transmission latency, traffic security, etc.

Figure 2:
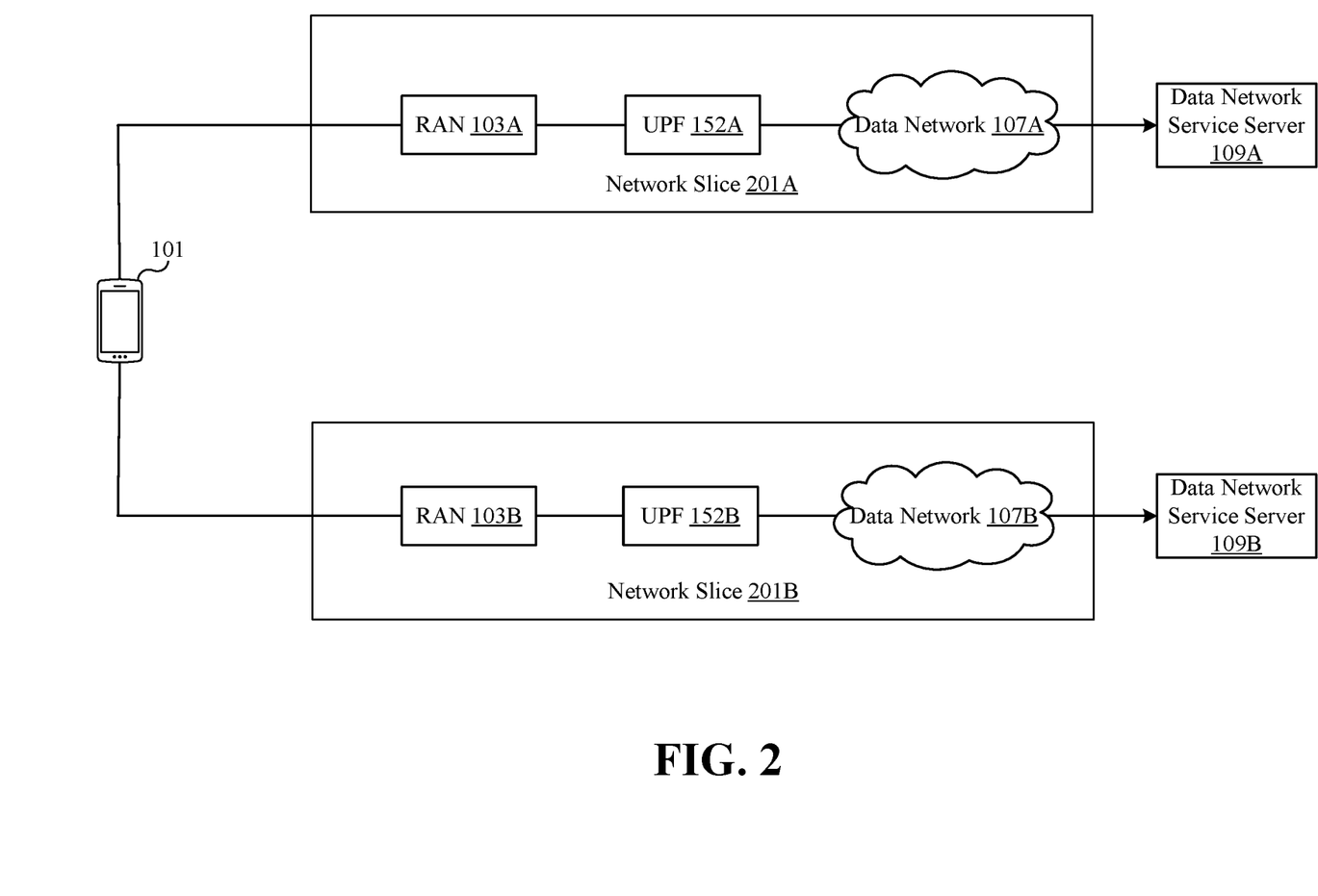
FIG. 2 is a schematic diagram showing an example system for communicating using network slices.

FIG. 2 is a schematic diagram showing an example system for communicating using network slices. The system may include network slices 201A, 201B. A network slice of the network slices 201A, 201B may be identified by an identifier (e.g., a Single Network Slice Selection Assistance Information (S-NSSAI)). The network slice 201A may comprise a radio access network 103A, a UPF 152A, and a data network 107A. The network slice 201B may comprise a radio access network 103B, a UPF 152B, and a data network 107B. The network slices 201A, 201B may comprise additional or alternative components, such as other network functions of the core network 105. The network slices 201A, 201B may be implemented on the same physical infrastructure.

The network slices 201A, 201B may have different characteristics. Different resources may be assigned to the network slices 201A, 201B to implement their network functions (e.g., using Network Function Virtualization). As one example, different amounts of computing resources may be used to implement the UPF 152A and the UPF 152B. As another example, different amounts of computing resources may be used to implement a portion of the RAN 103A and a portion of the RAN 103B (e.g., to implement the central units of the RANs 103A, 103B if they are cloud radio access networks). Additionally, messages sent via the network slices 201A, 201B may be treated differently by the physical infrastructure. As one example, messages sent via the network slices 201A, 201B may be treated differently by the data network 107, which may prioritize messages sent via one of the network slices, as if the network slices 201A, 201B are associated with two different data networks 107A, 107B.

Figure 3:
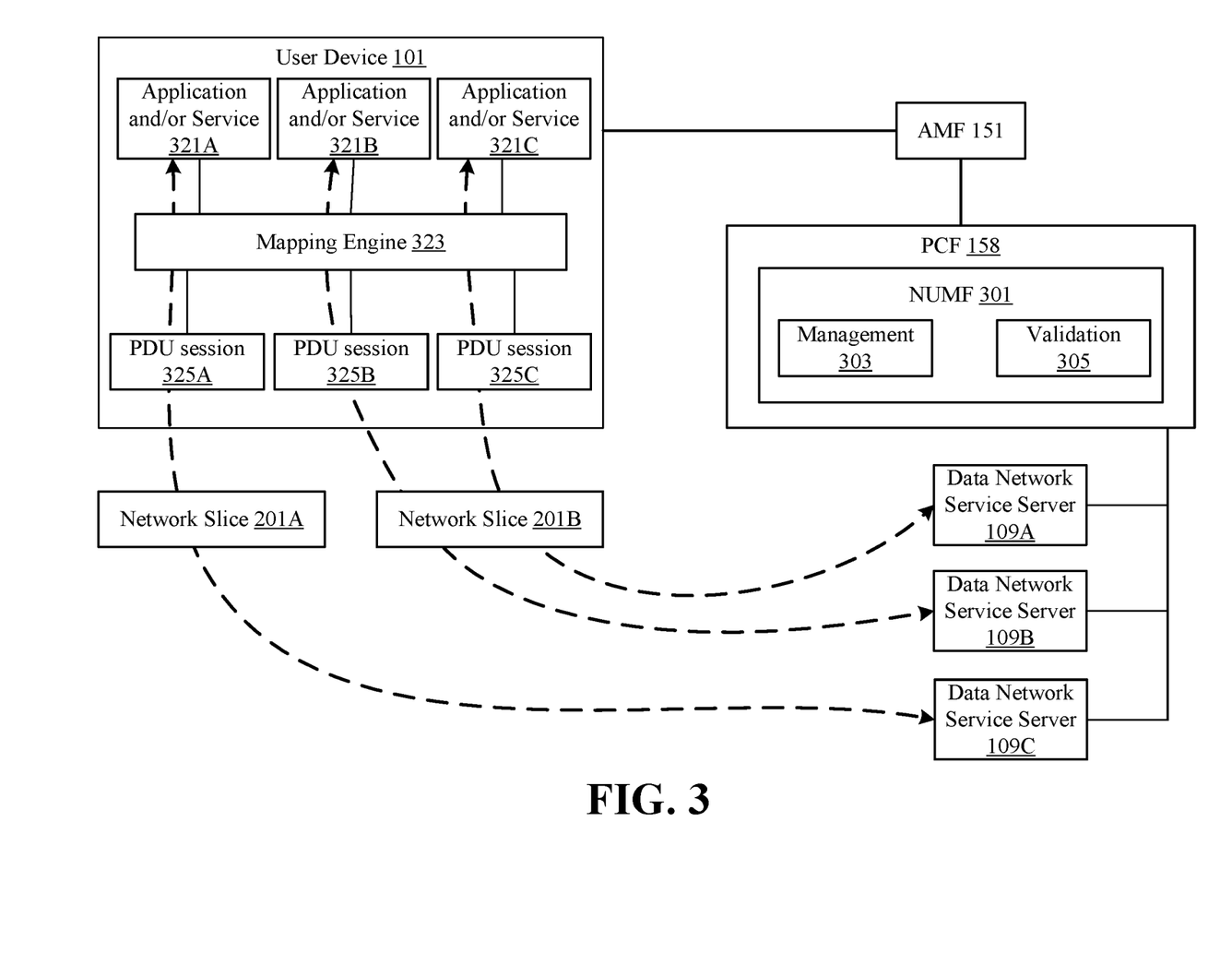
FIG. 3 is a schematic diagram showing an example system for using and configuring user equipment route selection policy rules.

The user device 101 may communicate with the data network service servers 109A, 109B via the network slice 201A, the network slice 201B, and/or other network slices. The user device 101 may determine the network slice via which to send particular traffic generated by the user device 101 based on user equipment (UE) route selection policy (URSP) rules. FIG. 3 is a schematic diagram showing an example system for using and configuring URSP rules. The system may include the user device 101, the AMF 151, the PCF 158, the network slices 201A, 201B, and one or more data network service servers (e.g., data network service servers 109A-109C).

To communicate via a network slice, the user device 101 may establish, in the network slice, one or more packet data unit (PDU) sessions to data networks. A PDU session may comprise an association between a user device and a data network that provides a connectivity service. The user device 101 may indicate the S-NSSAI of the network slice to the AMF 151 and/or the SMF 153 during the PDU session establishment procedure to create a PDU session in the network slice. As one example, the user device may establish the PDU session 325A in the network slice 201A, and may establish the PDU sessions 325B, 325C in the network slice 201B. The PDU sessions 325A, 325B, 325C may be associated with different performance parameters (such as quality of service (QOS)), and/or may be connected to different types of data networks (e.g., an IP network, a non-IP network, the Ethernet, etc.).

The user device 101 may run and/or have installed various applications and/or services (e.g., applications and/or services 321A-321C). The applications and/or services 321A-321C may be, for example, an augmented reality application or service, a vehicle-to-everything application or service, and/or other types of applications and/or services running on computing devices. The applications and/or services 321A-321C may be connected to, for example, data network service servers, other computing devices, Software-Defined Networking (SDN) or Network Function Virtualization (NFV) networks, and/or any other sub-application/data network (e.g., a Voice over IP (VoIP) network). The applications and/or services 321A-321C may transmit different types of traffic. For example, an application or service may be an augmented reality application or service or a virtual reality application or service, and may generate enhanced mobile broadband traffic. Another application or service may be a thermostat application or service, and may generate Internet of Things traffic. Another application or service may be a vehicle-to-everything application or service, and may generate ultra-reliable low latency traffic. The user device 101 (e.g., via the mapping engine 323) may use URSP rules to direct the different types of traffic from the applications and/or services 321A-321C to appropriate network slices and/or PDU sessions. For example, based on a URSP rule, the user device 101 may route traffic from a virtual reality application or service to an eMBB type network slice.

A URSP rule may indicate an application or service and the corresponding network slice (and/or PDU session) that may be used for transmitting traffic associated with the application or service. In certain situations, the user device 101 might not store a URSP rule for a particular application or service, and the traffic associated with that application or service may be transmitted according to a default URSP rule, which may direct the traffic to a default network slice. As new applications and/or services emerge to provide new applications and/or services to users, traffic associated with the new applications and/or services may be routed via a default network slice that might not be suitable for routing the traffic. User experience may be negatively affected.

A negotiable URSP Management Function (NUMF) 301 in the PCF 158 may be used to alleviate the challenges. The NUMF 301 may be configured to generate URSP rules for new applications and/or services, for example, based on information obtained from data network service servers, the UDM 159, and/or other computing devices. A user device may be configured to query the NUMF 301 for URSP rules, for example, if a new application or service is installed and/or updated on the user device. In this manner, applications and/or services running on a user device may be routed via the appropriate network slices based on URSP rules specific to the applications and/or services.

The NUMF 301 may include a management component 303 and a validation component 305. The management component 303 may be configured to generate URSP rules and update user devices with URSP rules. The validation component 305 may be configured to determine whether requests to obtain URSP rules are validly generated and/or transmitted (e.g., in order to deter malicious requests). More details regarding updating the URSP rules on the user devices are discussed in connection with FIGS. 4-5.

Figure 4:
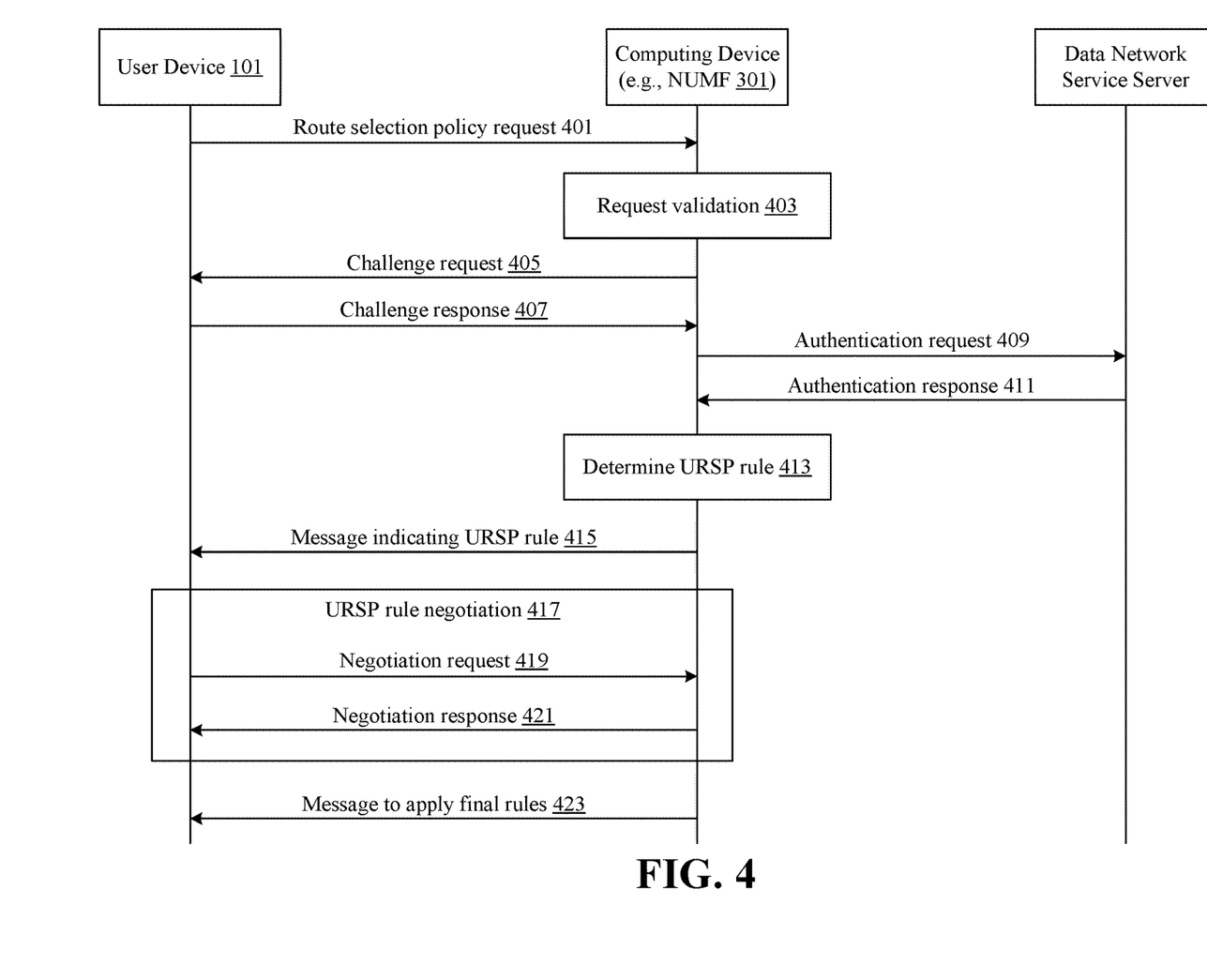
FIG. 4 is an event sequence showing an example method for configuring user equipment route selection policy rules.

FIG. 4 is an event sequence showing an example method for configuring URSP rules. While the steps of the event sequence are described in a particular order, the order of the steps may be altered without departing from the scope of the disclosure provided herein. Although the event sequence is described as being performed by a particular arrangement of computing systems, devices, and/or networks (e.g., the user device 101, a computing device, and a data network service server), the processes may be performed by a greater or smaller number of computing systems, devices, and/or networks, and/or by any type of computing system, device, and/or network.

In step 401, the user device 101 may send, to a computing device (e.g., the NUMF 301), a route selection policy request. The route selection policy request may be sent via the AMF 151, and may be sent in early data transmissions (e.g., random access channel (RACH) messages), radio resource control (RRC) messages, and/or any other type of message. The route selection policy request may indicate one or more applications and/or services (e.g., via one or more application and/or service identifiers). The user device 101 may send the route selection policy request in various situations. For example, the user device 101 may send the route selection policy request when the user device 101 attaches to the core network 105 (e.g., registers with the core network 105 to receive connectivity services). During or after the attachment procedure, the user device 101 may determine which application(s) and/or service(s) installed on the user device 101 might not have corresponding URSP rule(s). The route selection policy request may seek to obtain the URSP rule(s) for those application(s) and/or service(s).

The user device 101 may additionally or alternatively send the route selection policy request if a new application or service is installed on the user device 101 and the user device 101 does not store a URSP rule for the new application or service. The route selection policy request may seek to obtain the URSP rule for the new application or service. Additionally or alternatively, the user device 101 may determine whether the user device 101 stores URSP rule(s) for application(s) and/or service(s) installed on the user device 101, and/or send the route selection policy request for the URSP rule(s) not stored on the user device 101 at various times, such as when the user device 101 detects that it has moved from one location to another location, when the user device 101 receives messages indicating certain URSP rule(s) from the PCF 158, when the user device 101 receives messages indicating policy updates from the PCF 158, when the user device 101 performs a handover based on service changes or network changes, and/or when other events happen. Additionally or alternatively, the user device 101 may send a request for URSP rule(s) for applications and/or services stored on the user device 101 periodically. Additionally or alternatively, the core network 105 may configure the user device 101 to identify whether and/or when to send route selection policy requests.

The user device 101 may monitor the performance of an application or service, of the applications and/or services installed on the user device 101, and may send a route selection policy request if the performance of the application or service does not satisfy a performance threshold. For example, the user device 101 may monitor the performance of a virtual reality application or service, and may determine if the quality of the video (and/or other types of data) as received via the network slice that the user device 101 is currently using (e.g., a default network slice) satisfies (e.g., meets or exceeds) a quality threshold. If not, the user device 101 may send a route selection policy request to obtain an updated network slice for the application or service.

In step 403, the computing device may receive the route selection policy request, and may validate the received route selection policy request (e.g., in order to deter malicious requests). The route selection policy request may indicate information used for validating the request. For example, the route selection policy request may indicate validation parameters, and the computing device may validate the route selection policy request based on the validation parameters. The validation parameters may be, for example, a token, a password, a random value, etc., generated by a data network service server associated with the application or service indicated in the route selection policy request (e.g., by an entity that developed and/or published the application or service). The validation parameters may be distributed to the user device 101, for example, when the application or service is downloaded by the user device 101. The validation parameters may also be transmitted to the computing device. If the computing device determines that the validation parameters indicated in the route selection policy request do not match the validation parameters that the computing device received from the data network service server, the computing device might not further process the route selection policy request. In this manner, the computing device may detect route selection policy requests sent by spoofed applications and/or services.

The computing device may validate the route selection policy request based on an identifier of the application or service indicated in the route selection policy request. The computing device may store a blacklist and/or whitelist of applications and/or services, which may indicate whether URSP rules are permitted to be generated for the applications and/or services. For example, if an application or service is determined to be a malicious application or service, the computing device may blacklist the application or service. If the computing device determines that URSP rules are not permitted to be generated for the application or service indicated in the route selection policy request, the computing device might not further process the route selection policy request.

Additionally or alternatively, the route selection policy request may indicate an identifier of the user device 101, and the computing device may validate the route selection policy request based on the user device identifier. The computing device may store a blacklist and/or whitelist of user devices, which may indicate whether the user devices have permission to send route selection policy requests. A user device might not have permission if the computing device determines that the user device frequently sends route selection policy requests indicating validation parameters not matching the ones received from the data network service servers. If the computing device determines the user device 101 does not have permission to send the route selection policy request, the computing device might not further process the route selection policy request.

If the route selection policy request does not indicate the information used for validating the route selection policy request, the computing device may send, to the user device 101, a challenge request in step 405. The challenge request may request the user device 101 to send the information used for validating the route selection policy request to the computing device. The user device 101 may receive the challenge request, and may send a challenge response to the computing device in step 407. The challenge response may indicate the information used for validating the route selection policy request. The computing device may use the information in the challenge response to validate the route selection policy request in a similar manner as discussed in step 403. If the computing device does not receive the challenge response from the user device 101 within a time threshold after sending the challenge request, the computing device may determine not to further process the route selection policy request.

The computing device may additionally or alternatively validate the route selection policy request using a data network service server associated with the application or service indicated in the route selection policy request (e.g., in situations where the data network service server does not distributed the validation parameters to the computing device). In step 409, the computing device may send, to the data network service server, an authentication request indicating the information used for validating the route selection policy request (such as the identifier of the user device 101, the identifier of the application or service, and/or the validation parameters). The data network service server may receive the authentication request, and may validate the route selection policy request based on the information. For example, the data network service server may determine whether the validation parameters indicated in the authentication request match the validation parameters generated and stored by the data network service server. In step 411, the data network service server may send, to the computing device, an authentication response indicating whether the route selection policy request is valid.

If the route selection policy request is validated, the computing device may determine the URSP rule(s) for the application(s) and/or service(s) indicated in the route selection policy request in step 413. The computing device may obtain information related to the application(s) and/or service(s) from various sources, such as data network service server(s) associated with the application(s) and/or service(s) and/or the UDM 159. For example, the computing device may receive threshold performance parameters (e.g., quality of service, bandwidth, transmission latency), and may select a network slice and/or PDU session that satisfies the performance parameters. The computing device may include the selected network slice and/or PDU session in a URSP rule for the application or service of the user device 101. More details regarding determining URSP rules by the computing device are discussed in connection with FIG. 5.

After determining the URSP rule(s) for the application(s) and/or service(s) indicated in the route selection policy request, the computing device may send, to the user device 101, a message indicating the determined URSP rule(s) in step 415. The user device 101 may receive the message, and may extract the URSP rule(s) from the message. The user device 101 may determine whether to accept or reject the URSP rule(s) received from the computing device based on various criteria. If the user device 101 determines to reject one or more URSP rules received from the computing device, the user device 101 may initiate URSP rule negotiations with computing device in step 417.

The user device 101 may determine whether to accept or reject a URSP rule for an application or service and received from the computing device. Whether to accept or reject the URSP rule may be based on expected performance parameters associated with the application or service stored on the user device 101. The expected performance parameters may indicate, for example, a quality of service, bandwidth, transmission latency, data security, etc. In some examples, the expected performance parameters may indicate a quality of service, bandwidth, transmission latency, and/or data security level for the application or service to work in an optimal state.

The user device 101 may receive the expected performance parameters from a data network service server associated with the application or service. The developers of the application or service may be aware of the appropriate quality of service, bandwidth, or transmission latency for the application or service, and may enter that information to the data network service server. Additionally or alternatively, the data network service server may monitor various instances of the application or service running on user devices. The various instances of the application or service may use network slices and/or PDU sessions with the different performance parameters. The data network service server may determine the expected performance parameters for the application or service to function properly (e.g., for a virtual reality application or service to have transmitted video quality exceeding a video quality threshold).

The user device 101 may determine whether the network slice and/or PDU session indicated in the URSP rule received from the computing device satisfies (e.g., meets or exceeds) the expected performance parameters associated with the application or service. If so, the user device 101 may accept the URSP rule, may indicate the acceptance to the computing device, and may apply the URSP rule. Otherwise, the user device 101 may reject the URSP rule. Additionally or alternatively, the URSP rule received from the computing device may indicate a charging rate for using the indicated network slice and/or PDU session. The user device may determine whether the charging rate is below a threshold charging rate of the user device 101 (e.g., one dollar per one gigabyte of data). If so, the user device 101 may accept the URSP rule. Otherwise, the user device 101 may reject the URSP rule. The threshold charging rate may be set, for example, by a user of the user device 101.

If the user device 101 determines to reject the URSP rule received from the computing device, the user device 101 may send a negotiation request in step 419. The core network 105 may configure the user device 101 about whether to send negotiation requests. The negotiation request may indicate the expected performance parameters (and/or the threshold charging rate). Additionally or alternatively, the user device 101 may store identifiers of various network slices and/or PDU sessions. The user device 101 may select a network slice and/or PDU session that satisfies the expected performance parameters, and may include the selected network slice and/or PDU session in the negotiation request.

The computing device may receive the negotiation request from the user device 101, and may determine if the expected performance parameters fall within a range of the threshold performance parameters used by the computing device in determining the URSP rule in step 413. The range may be set, for example, by an operator and/or administrator of the core network 105. Additionally or alternatively, the computing device may adjust the range based on the type of the user device 101. For example, the computing device may set the range to be larger if the user device 101 is associated with a prioritized user. Additionally or alternatively, the computing device may adjust the range based on current network conditions (e.g., current conditions of the radio access network 103, the core network 105, and/or the data network 107). For example, if the network(s) are currently overloaded (e.g., if the communication latency via the network(s) exceeds a threshold latency), the computing device may set the range to be smaller.

If the expected performance parameters fall within the range of the threshold performance parameters used by the computing device in determining the URSP rule in step 413, the computing device may determine another network slice and/or PDU session that satisfies the expected performance parameters. In step 423, the computing device may send, to the user device 101, a message to apply the determined network slice and/or PDU session.

If the expected performance parameters do not fall within the range of the threshold performance parameters used by the computing device in determining the URSP rule in step 413, the computing device may send, to the user device 101, a negotiation response in step 421. The negotiation response may indicate a set of performance parameters within the range of the threshold performance parameters used by the computing device in determining the URSP rule in step 413. The user device 101 may determine whether to accept or reject the set of performance parameters indicated in the negotiation response. The computing device may set a limit on the number of negotiation rounds that may happen between the user device 101 and the computing device. The limit may be adjusted based on the type of the user device 101 and/or current network conditions. For example, if the user device 101 is associated with a prioritized user, and/or if the network(s) are not currently overloaded, the limit may be adjusted to be a larger value. The use device 101 and the computing device may apply a URSP rule if a final agreement is made on the URSP rule after the negotiation.

Additionally or alternatively, the computing device may set up criteria for the negotiations between the computing device and the user device 101. For example, the computing device may determine, based on the type of the user device 101, whether to allow the user device 101 to negotiate (e.g., to obtain a URSP rule different from the one initially assigned by the computing device). As one example, if the user device 101 is associated with a prioritized user, the computing device may allow the user device 101 to negotiate. If the user device 101 is associated with a regular user, the computing device might not allow the user device 101 to negotiate. Additionally or alternatively, the computing device may determine, based on current network conditions, whether to allow the user device 101 to negotiate. For example, if the network(s) are currently overloaded, the computing device might not allow the user device 101 to negotiate (e.g., to obtain a higher performance network slice and/or PDU session).

If the computing device determines not to allow the user device 101 to negotiate, and if the user device 101 sends a negotiation request to the computing device, the computing device may send, to the user device 101, a negotiation response indicating a rejection of the negotiation request. In such a situation, the user device 101 may apply the URSP rule initially sent by the computing device (e.g., in step 415) or a default URSP rule of the user device 101. Additionally or alternatively, if the user device 101 is allowed to negotiate, and if the number of negotiation requests sent by the user device 101 with respect to a particular URSP rule initially assigned by the computing device (e.g., in step 415) exceeds the limit on the number of negotiation rounds that may happen between the user device 101 and the computing device, the computing device may send, to the user device 101, a negotiation response indicating a rejection of the negotiation request.

Figure 5:
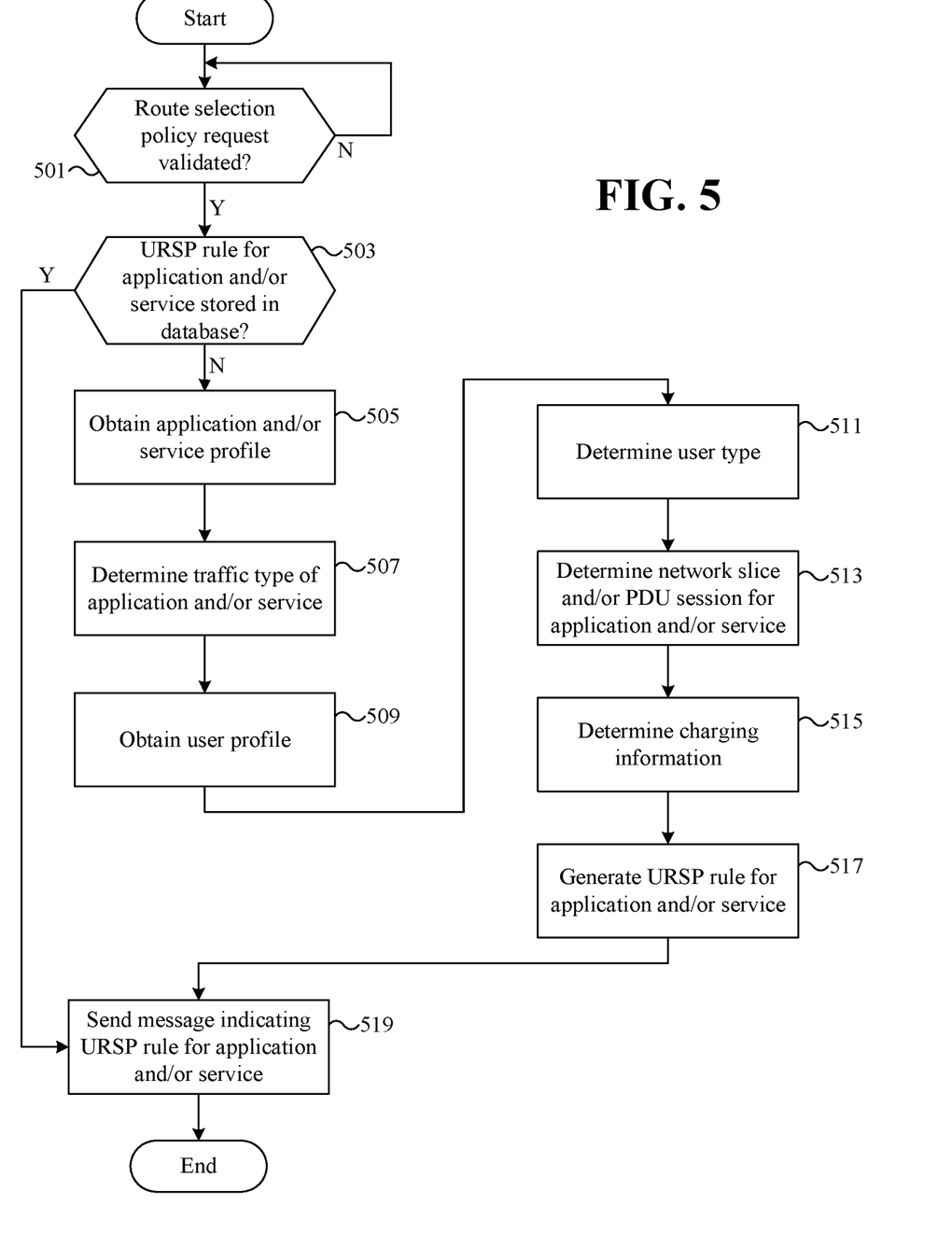
FIG. 5 is a flowchart showing an example method for configuring user equipment route selection policy rules.

FIG. 5 is a flowchart showing an example method for configuring URSP rules. The method may be performed, for example, by the system as discussed in connection with FIG. 3 (e.g., the NUMF 301). The steps of the method may be described as being performed by particular components and/or computing devices for the sake of simplicity, but the steps may be performed by any component and/or computing device. The processes associated with step 413 of FIG. 4 may be implemented using the processes described below.

In step 501, a computing device (e.g., the NUMF 301) may determine whether a received route selection policy request is validated. The validation of the route selection policy request may be performed in various manners and/or based on various types of information as discussed in connection step 403 of FIG. 4. If the route selection policy request is validated (step 501: Y), the method may proceed to step 503. Otherwise (step 501: N), the computing device may await a validated route selection policy request.

In step 503, the computing device may determine whether a URSP rule for the application or service indicated in the route selection policy request is stored in a database of the computing device. The computing device may have a database storing URSP rules for applications and/or services. The database may be any type of storage. The computing device may search the database to determine whether a URSP rule corresponding to the application or service indicated in the route selection policy request is stored in the database. If the URSP rule for the application or service is stored in the database of the computing device (step 503: Y), the method may proceed to step 519. In step 519, the computing device may send, to the user device 101, a message indicating the URSP rule for the application or service. If the route selection policy request indicates multiple applications and/or services, the computing device may determine the URSP rules for the multiple applications and/or services, and may send, to the user device 101, a message indicating the URSP rules for the multiple applications and/or services.

If the URSP rule for the application or service indicated in the route selection policy request is not stored in the database of the computing device (step 503: N), the method may proceed to step 505. In step 505, the computing device may obtain an application or service profile associated with the application or service. For example, the computing device may send, to a data network service server associated with the application or service, a request for the application or service profile. The application or service profile may indicate, for example, one or more types of traffic that the application or service may generate (e.g., enhanced mobile broadband traffic, Internet of Things traffic, ultra-reliable low latency traffic, or other types of traffic). The application or service profile may also indicate, for example, a threshold quality of service, bandwidth, transmission latency, or other performance parameters for the application or service.

The data network service server may receive the request for the application or service profile. The data network service server may generate the application or service profile, for example, based on information provided by developers or administrators of the application or service. For example, the developers of the application or service may be aware of what type of traffic the application or service may generate, and may enter that information to the application or service profile. The developers of the application or service may also be aware of the threshold quality of service, bandwidth, transmission latency, or other performance parameters for the application or service, and may enter that information to the application or service profile. The data network service server may send, to the computing device, the application or service profile. In step 507, the computing device may receive the application or service profile from the data network service server, and may extract information (such as the types of traffic) from the application or service profile. The computing device may determine the types of traffic of the application or service and/or the threshold quality of service for the application or service.

In step 509, the computing device may obtain a user profile associated with the user device 101. For example, the computing device may send, to the UDM 159, a request for the user profile. The user profile may indicate a user type, such as a very important person (VIP) user or a regular user. The request may indicate, for example, an identifier of the user device 101 and/or an identifier of the user of the user device 101. The UDM 159 may store user subscription information or may manage user identification and/or access authorization. In response to receiving the request, the UDM 159 may, for example, search its user subscription database to retrieve the user profile for the user of the user device 101. The UDM 159 may send the user profile to the computing device.

The computing device may receive the user profile from the UDM 159. In step 511, the computing device may extract information (such as the user type) from the received user profile. For example, the computing device may determine whether the user is a prioritized user or a regular user. Additionally or alternatively, the computing device may receive the user profile from the data network service server. The data network service server may gather information and generate the user profile. The data network service server may distribute the user profile to both the user device 101 and the computing device. The computing device may also receive the user profile from the user device 101, and may determine to use the user profile received from the user device 101 if it matches with the one the computing device received from the data network service server.

In step 513, the computing device may determine a network slice and/or a PDU session for an application or service indicated in the route selection policy request. For example, the computing device may determine a network slice for the application or service based on the type of traffic of the application or service. The computing device may select a network slice suitable for transmitting the type of traffic of the application or service. For example, if the application or service profile indicates that the application or service generates enhanced mobile broadband traffic, the computing device may select an enhanced mobile broadband type network slice for the application or service.

The computing device may determine the network slice for the application or service based on the threshold quality of service, bandwidth, transmission latency, or other performance parameters for the application or service. The user device 101 may have access to a number of network slices, and each of the network slices may have its own performance parameters (e.g., performance guarantees). As one example, one of the network slices may have aggregate throughput guarantees (e.g., greater than 100 megabits per second (Mbps) or less than 200 Mbps), guaranteed resource shares (e.g., greater than or less than 25% of capacity), and/or latency bounds (e.g., smaller than 500 milliseconds). The computing device may determine, from the number of network slices, one or more network slices that satisfy (e.g., meet or exceed) the threshold performance parameters for the application or service. The determined one or more network slices may be used for the application or service.

The computing device may determine a PDU session for the application or service, for example, based on the type of traffic of the application or service and/or the threshold performance parameters associated with the application or service. For example, the computing device may select a PDU session in a determined network slice for the application or service. Additionally or alternatively, a PDU session may be associated with a traffic type and/or performance parameters. For example, a particular PDU may be suitable for enhanced mobile broad band traffic, and/or may have certain performance guarantees. The computing device may select a PDU session that is suitable for the traffic type of the application or service and/or that satisfies the threshold performance parameters associated with the application or service.

The computing device may additionally determine the network slice and/or PDU session based on the user type of the user of the user device 101. In this manner, the network slice and/or PDU session for different users of the same application or service may be different. For example, a higher quality of service network slice and/or PDU session may be assigned to a prioritized user, and a lower quality of service network slice and/or PDU session may be assigned to a regular user, if each network slice and/or PDU session satisfies the threshold performance parameters associated with the application or service.

In step 515, the computing device may determine the charging information for the determined network slice and/or PDU session. The charging information may be determined based on the network slice and/or PDU session. Each network slice and/or PDU session may be associated with a particular charging rate. This information may be, for example, stored in a database of the computing device. As one example, a higher performance network slice and/or PDU session may be charged at a higher rate.

The application or service profile received from the data network service server may indicate that the data network service server may sponsor or pay the charges of the network slice and/or PDU session selected for an application or service if the user is a prioritized user (e.g., a very important person user). In such a situation, the computing device may set the charges of the determined network slice and/or PDU session to be zero (0), if the user that sent the route selection policy request is a prioritized user. If the URSP rule indicating the charges of the network slice and/or PDU session is accepted by a user device, the computing device may notify the core network 105 the party to be charged for the usages of the network slice and/or PDU session. For example, if the data network service server sponsors the charges, the core network 105 may be notified to charge an entity associated with the data network service server.

In step 517, the computing device may generate a URSP rule for the application or service indicated in the route selection policy request. The URSP rule may have a data field indicating the determined network slice and/or PDU session and a data field indicating the determined charging information. The generated URSP rule may also be recorded and stored in the database of the computing device, so that if the computing device receives another route selection policy request for a same application or service and a same type of user, the computing device may retrieve the URSP rule from the database. In some examples, if the computing device determines a plurality of network slices and/or PDU sessions suitable for the application or service, the computing device may, for example, include the network slice and/or PDU session that has the best performance parameters and that is free of charge. In step 519, the computing device may send the generated URSP rule to the user device 101.

Additionally or alternatively, the computing device may generate a URSP rule indicating multiple network slices and/or PDU sessions, if the application or service indicated in the route selection policy request may generate different types of traffic. For example, if an application or service generates both enhanced mobile broadband traffic and ultra-reliable low latency traffic, the computing device may generate a URSP rule indicating network slices and/or PDU sessions suitable for both types of traffic. The URSP rule may additionally indicate one or more traffic type descriptors of the network slices and/or PDU sessions. Based on the traffic type descriptors, the user device 101 may direct the traffic generated by the application or service to the appropriate network slice and/or PDU session.

Figure 6:
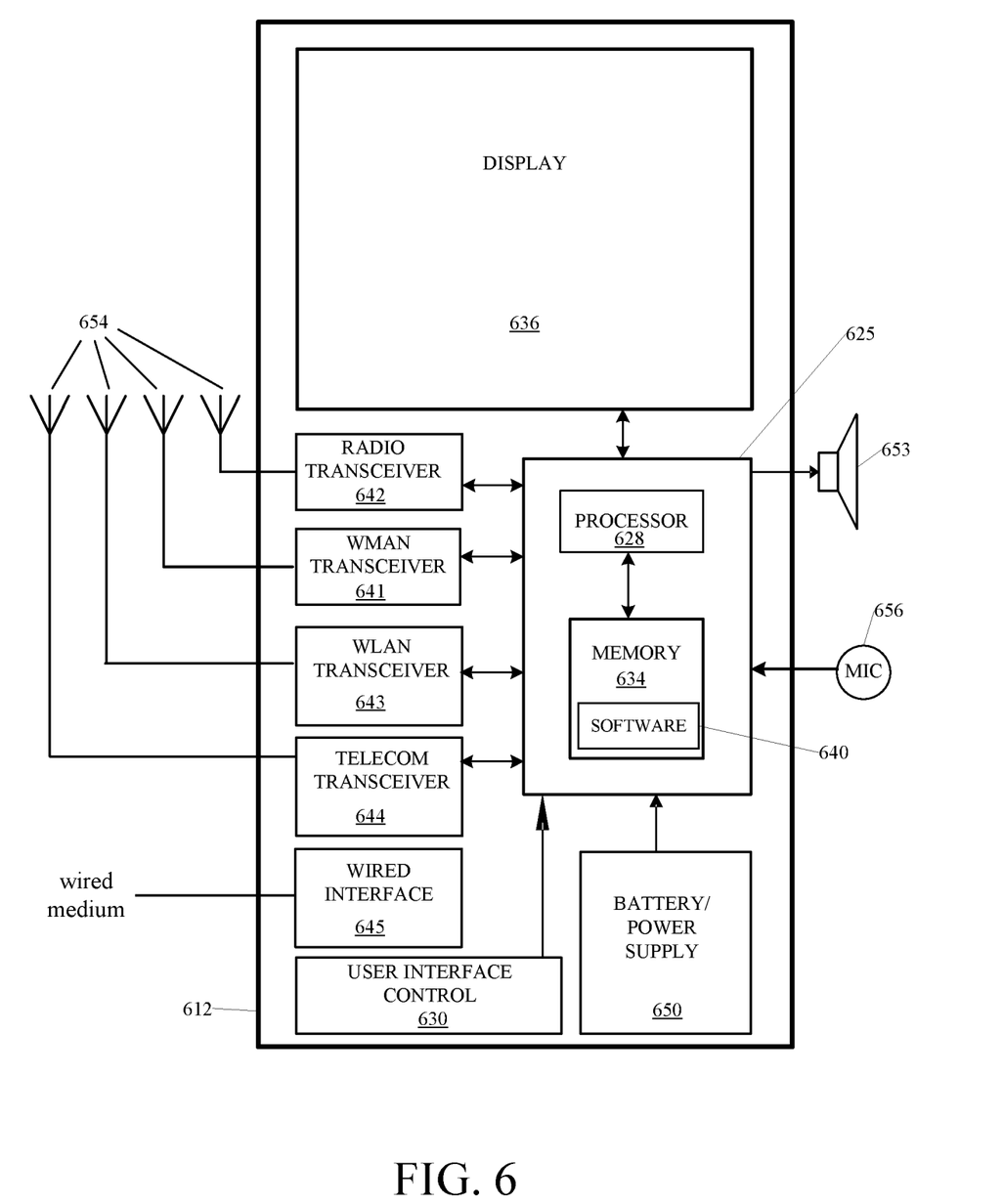
FIG. 6 shows an example apparatus that may be used in a network environment described herein or used to implement one or more aspects described herein.

FIG. 6 illustrates an example apparatus, in particular a computing device 612, that may be used in a communication network such as the one shown in FIG. 1, to implement any or all of the user device 101, the radio access network 103, the core network 105, the data network service servers 109A-109C, and/or other computing devices to perform the steps described above and in FIGS. 4-5. Computing device 612 may include a controller 625. The controller 625 may be connected to a user interface control 630, display 636 and/or other elements as shown. Controller 625 may include circuitry, such as for example one or more processors 628 and one or more memory 634 storing software 640 (e.g., computer executable instructions). The software 640 may comprise, for example, one or more of the following software options: user interface software, server software, etc., including a radio protocol stack, the network functions 151-160, the applications and/or services 321A-321C, the mapping engine 323, the PDU sessions 325A-325C, etc.

Device 612 may also include a battery 650 or other power supply device, speaker 653, and one or more antennae 654. Device 612 may include user interface circuitry, such as user interface control 630. User interface control 630 may include controllers or adapters, and other circuitry, configured to receive input from or provide output to a keypad, touch screen, voice interface—for example via microphone 656, function keys, joystick, data glove, mouse and the like. The user interface circuitry and user interface software may be configured to facilitate user control of at least some functions of device 612 though use of a display 636. Display 636 may be configured to display at least a portion of a user interface of device 612. Additionally, the display may be configured to facilitate user control of at least some functions of the device (for example, display 636 could be a touch screen).

Software 640 may be stored within memory 634 to provide instructions to processor 628 such that when the instructions are executed, processor 628, device 612 and/or other components of device 612 are caused to perform various functions or methods such as those described herein (for example, as depicted in FIGS. 4-5). The software may comprise machine executable instructions and data used by processor 628 and other components of computing device 612 and may be stored in a storage facility such as memory 634 and/or in hardware logic in an integrated circuit, ASIC, etc. Software may include both applications and/or services and operating system software, and may include code segments, instructions, applets, pre-compiled code, compiled code, computer programs, program modules, engines, program logic, and combinations thereof.

Memory 634 may include any of various types of tangible machine-readable storage medium, including one or more of the following types of storage devices: read only memory (ROM) modules, random access memory (RANI) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 628 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), hardware accelerators, digital signal processors, software defined radio components, combinations of hardware/firmware/software, or other special or general-purpose processing circuitry.

As used in this application, the term "circuitry" may refer to any of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone, server, or other computing device, to perform various functions) and (c) circuits, such as a microprocessor(s) or a portion of a microprocessor(s), that require software or firmware for operation, even if the software or firmware is not physically present.

These examples of "circuitry" apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a radio frequency circuit, a baseband integrated circuit or applications processor integrated circuit for a mobile phone or a similar integrated circuit in a server, a cellular network device, or other network device.

Device 612 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 643, one or more WMAN transceivers 641. Additionally or alternatively, device 612 may be configured to receive, decode and process transmissions through various other transceivers, such as FM/AM Radio transceiver 642, and telecommunications transceiver 644 (e.g., cellular network receiver such as CDMA, GSM, 4G LTE, 5G, etc.). A wired interface 645 (e.g., an Ethernet interface) may be configured to provide communication via a wired communication medium (e.g., fiber, cable, Ethernet, etc.).

Although the above description of FIG. 6 generally relates to a mobile device, other devices or systems may include the same or similar components and perform the same or similar functions and methods. For example, a computer communicating over a wired network connection (for example, the radio access network 103, the core network 105, and the data network service servers 109A-109C) may include the components or a subset of the components described above, and may be configured to perform the same or similar functions as device 612 and its components. Further access points as described herein may include the components, a subset of the components, or a multiple of the components (e.g., integrated in one or more servers) configured to perform the steps described herein.

Figure 7:
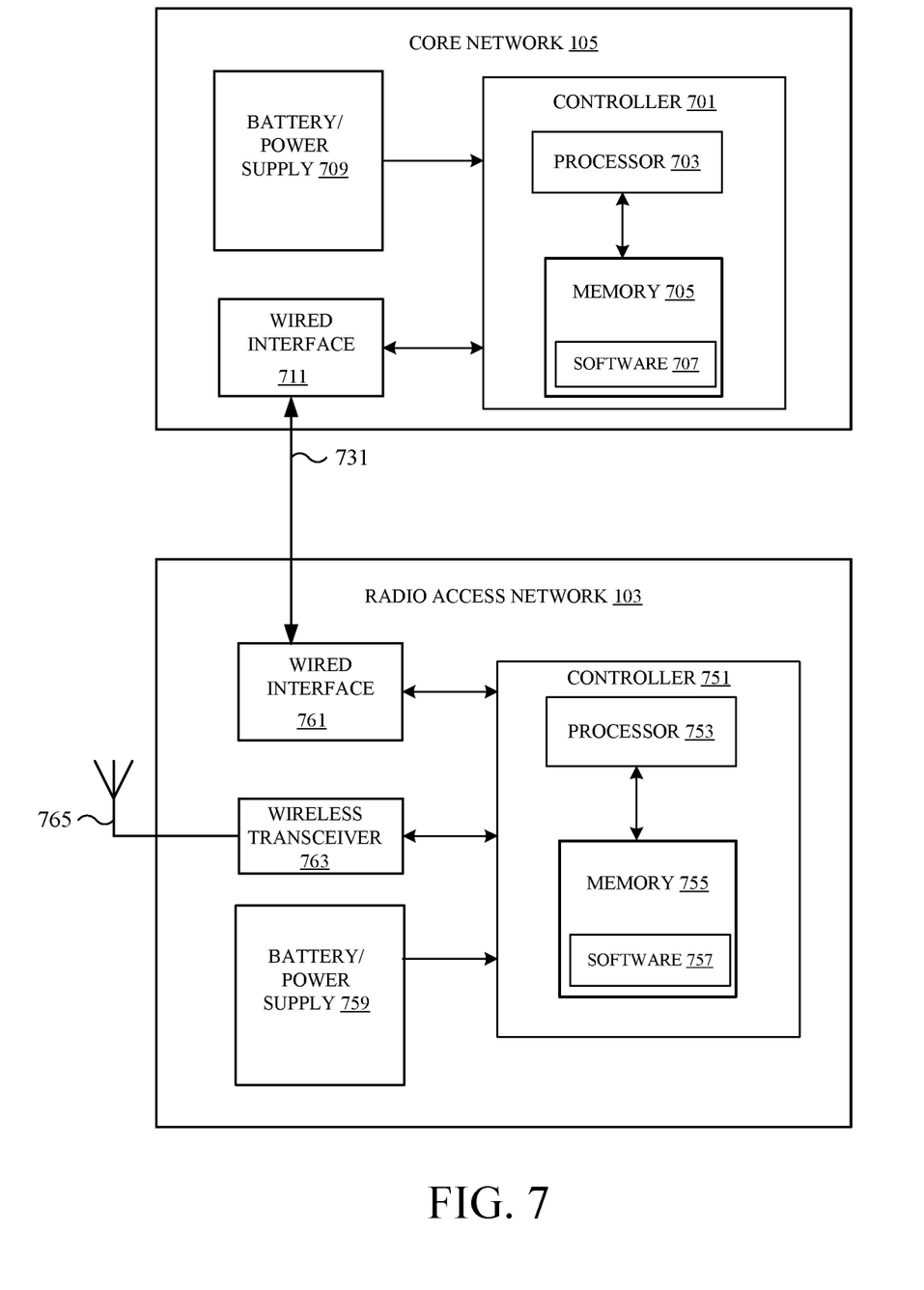
FIG. 7 shows an example system that may be used in a network environment described herein or used to implement one or more aspects described herein.

FIG. 7 illustrates an example system that may be used in a communication network such as the one shown in FIG. 1, to implement various devices described herein, such as core networks (e.g., the core network 105), radio access networks (e.g., the radio access network 103), and/or other computing devices to perform the steps described above and in FIGS. 4-5. The system may comprise one or more core networks (e.g., the core network 105), one or more radio access networks (e.g., the radio access network 103), and one or more communication links (e.g., communication link 731).

The core network 105 may include a controller 701, which may include circuitry, such as one or more processors 703 and one or more memory 705 storing software 707 (e.g., computer executable instructions). The software 707 may comprise, for example, the network functions 151-160. Software 707 may be stored within memory 705 to provide instructions to processor 703 such that when the instructions are executed, processor 703, the core network 105 and/or other components of the core network 105 are caused to perform various functions or methods such as those described herein (for example, as depicted in FIGS. 4-5). The core network 105 may include general-purpose processors, digital signal processors, hardware accelerators, or software defined radio components.

The core network 105 may include a battery 709 or other power supply device, and one or more wired interface 711. The wired interface 711 (e.g., an Ethernet interface) may be configured to provide communication via a wired communication medium (e.g., fiber, cable, Ethernet, etc.). The wired interface 711 may communicate with a wired interface 761 in the radio access network 103 via the communication link 731. The wired interface 711 may also communicate with a network (e.g., the data network 107).

The radio access network 103 may include a controller 751, which may include circuitry, such as one or more processors 753 and one or more memory 755 storing software 757 (e.g., computer executable instructions). The software 757 may comprise, for example, a radio protocol stack that is implemented by the radio access network 103. Software 757 may be stored within memory 755 to provide instructions to processor 753 such that when the instructions are executed, processor 753, radio access network 103 and/or other components of radio access network 103 are caused to perform various functions or methods such as those described herein.

The radio access network 103 may include a battery 759 or other power supply device, one or more wired interface 761, one or more wireless transceiver 763, and one or more antennae 765. The radio access network 103 or its various components may be configured to receive, decode and process transmissions through various transceivers, such as wireless transceiver 763 (e.g., cellular network receiver such as CDMA, GSM, 4G LTE, 5G, etc.). The wireless transceiver 763 may include downlink processing components and/or uplink processing components. The downlink processing components and/or uplink processing components may include radio frequency transmission components, radio frequency reception components, or baseband processing components. Processing components may include general-purpose processors, digital signal processors, software defined radio components, hardware accelerators, or software components. With the wireless transceiver 763 and the antenna 765, the radio access network 103 may be configured to communicate with a user device (e.g., the user device 101) according to various aspects described herein. The wired interface 761 (e.g., an Ethernet interface) may be configured to provide communication via a wired communication medium (e.g., fiber, cable, Ethernet, etc.). The wired interface 761 may communicate with the wired interface 711 in the core network 105 via the communication link 731.

The software may comprise machine executable instructions and data used by processor and other components of the core network 105 and/or the radio access network 103 and may be stored in a storage facility such as memory 705, 755 and/or in hardware logic in an integrated circuit, ASIC, etc. Software may include both applications and/or services and operating system software, and may include code segments, instructions, applets, pre-compiled code, compiled code, computer programs, program modules, engines, program logic, and combinations thereof.

Memory 705, 755 may include any of various types of tangible machine-readable storage medium, including one or more of the following types of storage devices: read only memory (ROM) modules, random access memory (RANI) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 703, 753 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

Although specific examples of carrying out the disclosure have been described, those skilled in the art will appreciate that there are numerous variations and permutations of the above-described systems and methods that are contained within the spirit and scope of the disclosure. Any and all permutations, combinations, and sub-combinations of features described herein, including but not limited to features specifically recited in the claims, are within the scope of the disclosure.

What is claimed is:

1. A method comprising:
    receiving, by a computing device, from a user device, and via a network, a route selection policy request, wherein the route selection policy request indicates a service;
    receiving, from a second computing device, a message indicating one or more types of traffic associated with the service;
    determining, based on the one or more types of traffic, a route selection policy associated with the service, wherein the route selection policy indicates one or more of a protocol data unit session for the service or a network slice for the service; and
    sending, to the user device, the route selection policy.

2. The method of claim 1, further comprising selecting, from a plurality of network slices, a network slice suitable for routing the one or more types of traffic.

3. The method of claim 1, further comprising:
    determining a user type associated with the user device, wherein the determining the route selection policy is further based on the user type; and
    determining, based on the one or more types of traffic and the user type, a charging rate for the service, wherein the route selection policy further indicates the charging rate.

4. The method of claim 1, further comprising:
    receiving, from the user device and based on the route selection policy, a negotiation request indicating a second route selection policy associated with the service;
    determining a range associated with the route selection policy; and
    based on determining whether the second route selection policy is within the range associated with the route selection policy, determining whether to accept the second route selection policy.

5. The method of claim 4, further comprising:
    based on determining to accept the second route selection policy, sending, to the user device, a message to apply the second route selection policy.

6. The method of claim 4, wherein the determining the range associated with the route selection policy is based on one or more of a user type associated with the user device or current conditions of the network.

7. The method of claim 4, further comprising:
    determining, based on one or more of a user type associated with the user device or current conditions of the network, whether to allow the user device to negotiate; and
    based on determining not to allow the user device to negotiate, sending, to the user device, a message to reject the negotiation request.

8. The method of claim 4, further comprising:
    determining a quantity of negotiation requests, associated with the service, received from the user device; and
    based on determining that the quantity of negotiation requests satisfies a threshold quantity, sending, to the user device, a message to reject the negotiation request.

9. The method of claim 1, further comprising determining, based on validation parameters associated with the route selection policy request, whether the route selection policy request is valid, wherein the determining the route selection policy is based on determining that the route selection policy request is valid.

10. The method of claim 1, further comprising:
    based on determining that validation parameters are not indicated in the route selection policy request, sending, to the user device, a challenge request for the validation parameters;
    receiving, from the user device, a message indicating the validation parameters;
    sending, to the second computing device, a second message indicating the validation parameters; and
    receiving, from the second computing device, a message indicating that the route selection policy request is valid.

11. The method of claim 1, further comprising determining, based on an identification of the service, whether the route selection policy is stored in a database of the computing device, wherein the determining the route selection policy is based on determining that the route selection policy is not stored in the database of the computing device.

12. An apparatus comprising:
    one or more processors; and
    non-transitory memory storing instructions that, when executed by the one or more processors, cause the apparatus to:
        receive, from a user device and via a network, a route selection policy request, wherein the route selection policy request indicates a service;
        receive, from a computing device, a message indicating one or more types of traffic associated with the service;
        determine, based on the one or more types of traffic, a route selection policy associated with the service, wherein the route selection policy indicates one or more of a protocol data unit session for the service or a network slice for the service; and
        send, to the user device, the route selection policy.

13. The apparatus of claim 12, wherein the memory stores instructions that, when executed by the one or more processors, further cause the apparatus to select, from a plurality of network slices, a network slice suitable for routing the one or more types of traffic.

14. The apparatus of claim 12, wherein the memory stores instructions that, when executed by the one or more processors, further cause the apparatus to:
    determine a user type associated with the user device, wherein the determining the route selection policy is further based on the user type; and
    determine, based on the one or more types of traffic and the user type, a charging rate for the service, wherein the route selection policy further indicates the charging rate.

15. The apparatus of claim 12, wherein the memory stores instructions that, when executed by the one or more processors, further cause the apparatus to:
    receive, from the user device and based on the route selection policy, a negotiation request indicating a second route selection policy associated with the service;
    determine a range associated with the route selection policy; and
    based on determining whether the second route selection policy is within the range associated with the route selection policy, determine whether to accept the second route selection policy.

16. The apparatus of claim 15, wherein the memory stores instructions that, when executed by the one or more processors, further cause the apparatus to:
    based on determining to accept the second route selection policy, send, to the user device, a message to apply the second route selection policy.

17. The apparatus of claim 15, wherein the memory stores instructions that, when executed by the one or more processors, further cause the apparatus to determine, based on one or more of a user type associated with the user device or current conditions of the network, the range associated with the route selection policy.

18. The apparatus of claim 15, wherein the memory stores instructions that, when executed by the one or more processors, further cause the apparatus to:
- determine, based on one or more of a user type associated with the user device or current conditions of the network, whether to allow the user device to negotiate; and
- based on determining not to allow the user device to negotiate, send, to the user device, a message to reject the negotiation request.

19. The apparatus of claim 15, wherein the memory stores instructions that, when executed by the one or more processors, further cause the apparatus to:
- determine a quantity of negotiation requests, associated with the service, received from the user device; and
- based on determining that the quantity of negotiation requests satisfies a threshold quantity, send, to the user device, a message to reject the negotiation request.

20. A non-transitory computer-readable medium storing instructions that, when executed by a computing device, cause the computing device to:
- receive, from a user device and via a network, a route selection policy request, wherein the route selection policy request indicates a service;
- receive, from a second computing device, a message indicating one or more types of traffic associated with the service;
- determine, based on the one or more types of traffic, a route selection policy associated with the service, wherein the route selection policy indicates one or more of a protocol data unit session for the service or a network slice for the service; and
- send, to the user device, the route selection policy.

* * * * *